United States Patent [19]

Miller et al.

[11] Patent Number: 5,251,949

[45] Date of Patent: Oct. 12, 1993

[54] VISOR MOUNTING SYSTEM

[75] Inventors: Douglas C. Miller, Hersey; Peter A. Franchino, West Branch, both of Mich.

[73] Assignee: Plasta Fiber Industries, Inc., Marlette, Mich.

[21] Appl. No.: 931,875

[22] Filed: Aug. 18, 1992

[51] Int. Cl.$^5$ ............................................. B60J 3/00
[52] U.S. Cl. ................................. 296/97.12; 16/297
[58] Field of Search ................ 296/97.12, 97.11, 97.9; 16/297, 303

[56] References Cited

U.S. PATENT DOCUMENTS

| | | | |
|---|---|---|---|
| 3,317,225 | 5/1967 | Cooper | 296/97.12 |
| 3,333,886 | 8/1967 | Wenger | 296/97.12 |
| 4,057,287 | 11/1977 | Lilja | 296/97.12 |
| 4,394,043 | 7/1985 | Moulding et al. | 296/97.11 |
| 4,489,974 | 12/1984 | Warhol | 296/97.12 |
| 4,582,356 | 4/1986 | Kaiser et al. | 296/97.11 |
| 4,617,699 | 10/1986 | Nakamura | 296/97.12 |
| 4,785,500 | 11/1988 | Langridge | 16/297 |
| 4,821,374 | 4/1989 | Gavagan | 16/321 |
| 4,841,599 | 6/1989 | Cebollero | 16/297 |
| 4,921,300 | 5/1990 | Lawassani et al. | 296/97.11 |
| 4,925,232 | 5/1990 | Hemmeke et al. | 296/97.8 |
| 5,071,186 | 12/1991 | Hemmeke et al. | 296/97.9 |

Primary Examiner—Robert R. Song
Attorney, Agent, or Firm—Brooks & Kushman

[57] ABSTRACT

A mounting system in combination with a sun visor which is movable between a detented retracted position and an extended position. A pivot shaft with a generally circular cross-section cooperates with the sun visor. The pivot shaft has a flat surface along one side of the shaft which provides a detent position for the sun visor when in the retracted position. An annular groove is provided which is oriented in a plane generally perpendicular to the longitudinal axis of the shaft. A first clip is provided which cooperates with the shaft and sun visor. The first clip has a first leg and a second leg, such that either the first leg or the second leg has a protrusion which cooperates with the annular groove to prevent either the first leg or the second leg from locating the flat surface while allowing the other leg to locate the flat surface to obtain the detent position when the sun visor is in the retracted position. A second clip cooperates with the first clip to securely fasten the first clip about the pivot shaft. A fasting means is provided for fastening the first clip to the second clip about the pivot shaft.

19 Claims, 4 Drawing Sheets

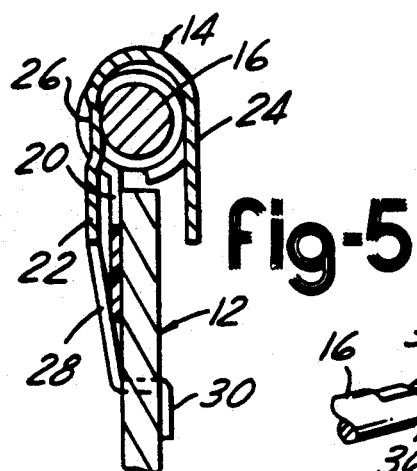
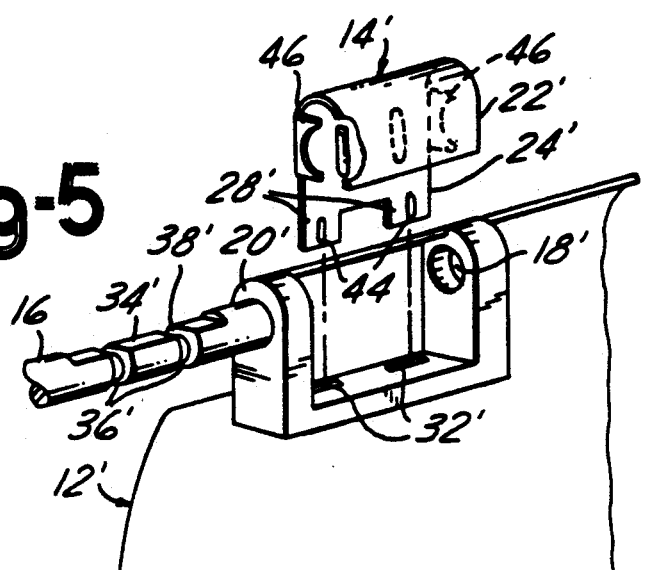
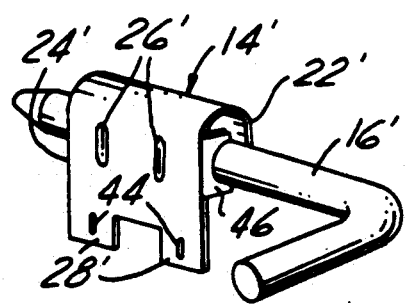
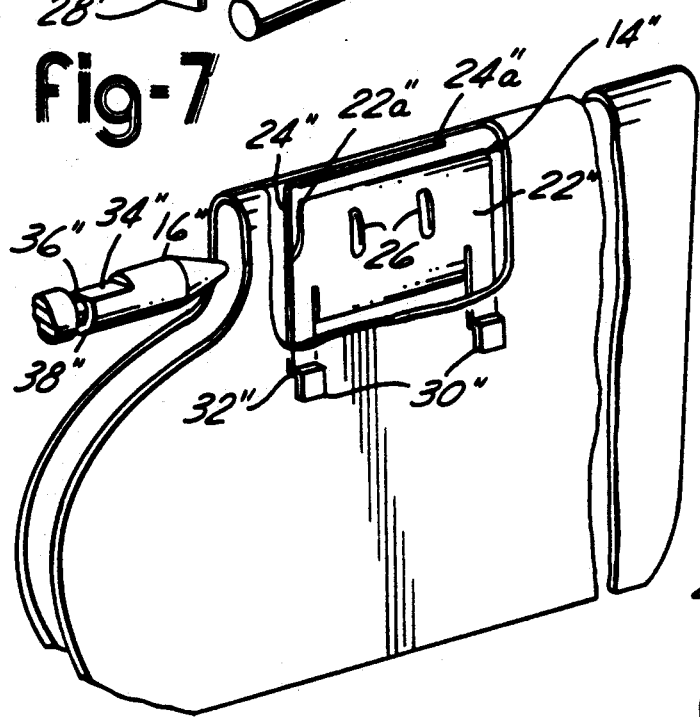
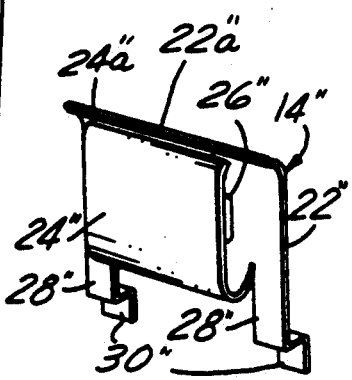

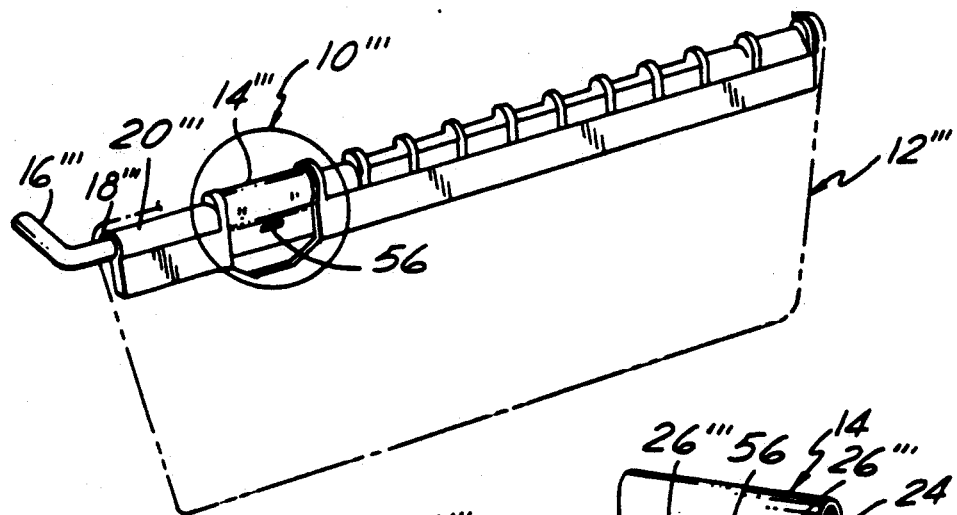
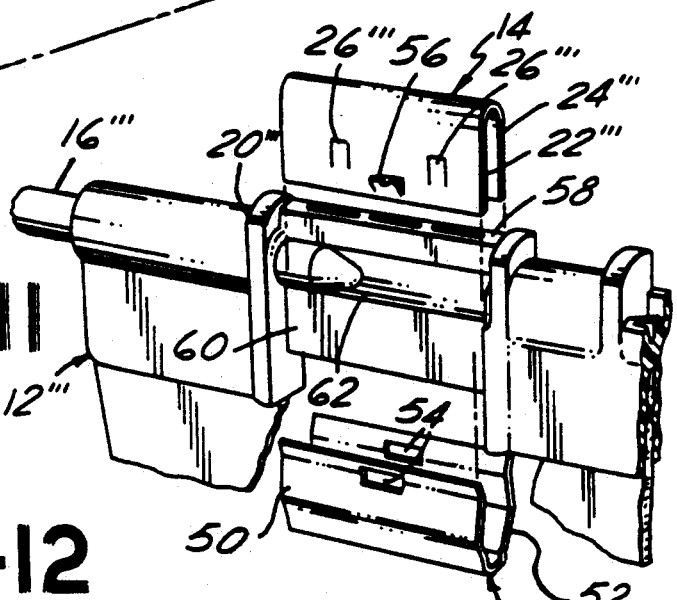
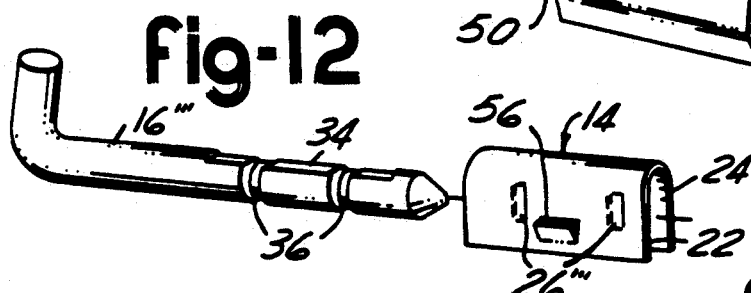
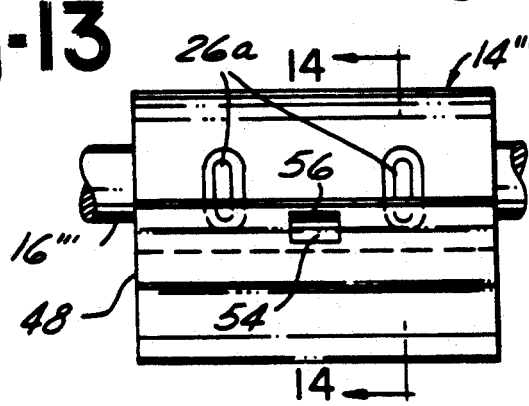
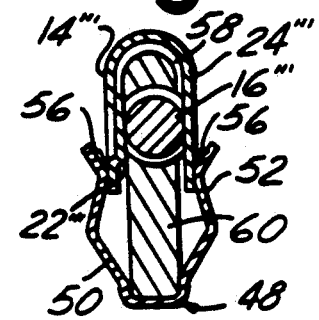

VISOR MOUNTING SYSTEM

TECHNICAL FIELD

This invention relates to a mounting system for use with a vehicle visor, and more particularly to a mounting system which eliminates a second detent position in vehicle visors.

BACKGROUND ART

Traditionally, U-shaped spring clips used with pivot shafts for visors have tended to produce a second, unwanted detent position oriented approximately 180° from the intended visor storage (retracted) position. This is due to the presence of two sides, or legs of the clip which press against opposite sides of the pivot shaft. A flat surface on the shaft, by necessity, engages first one leg and then the other as the visor is rotated about the shaft. Various modifications have been tried to minimize this second or double detent position. Most of these attempts fall into one of two categories.

The first category utilizes a clip with legs of different widths as measured in the direction of the axis of rotation. One of the legs is narrower than the flat surface on the shaft and is designed to fully engage the flat surface to provide a detent position. The other leg is wider than the flat surface and is not intended to engage the flat surface because both ends of the leg are held up away from the flat surface as they travel continuously on the cylindrical portions of the shaft outboard of the flat surface at opposite ends thereof. The center portion of the wider leg is intended to bridge the flat surface of the shaft, thereby avoiding engagement with the flat surface.

In practice, the wider leg does not bridge straight across the flat surface. Rather, it has a tendency to be distorted and bow or sag slightly as it bridges across the flat surface due to a strong inward acting clamping force of the clip. Even a slight amount of distortion causes the wider leg to come into contact with the edges of the flat surface causing a second, and often a third, unwanted detent position.

U.S. Pat. No. 4,785,500 to Langridge discloses a hinge assembly for vehicle accessories. In this configuration, one leg of the clip is wider than the other, relying on the wider arm to span the flat surface on the pivot arm. In this configuration, a second dent position will result for the reasons set forth above.

The second category or alternative approach to spring clips, is to have one or both legs incorporate openings, cut-aways or recessed areas. The pivot shaft is designed to have a flat surface which is interrupted by lobes (areas where there is not flat surface). When such a clip is in its detent position, these lobes align with the openings in the clip allowing the leg (or legs) of the clip to engage the flat surface. When rotated approximately 180°, from its detent position, the leg (or legs) of the clip are held out away from the flat surface by the lobes. The intent is to prevent the leg (or legs) of the clip from engaging the flat surface to avoid the unwanted second detent position.

In practice, such designs are not successful, because the inward clamping force of the clip causes the leg (or legs) to distort or bow inwards slightly at either end of the lobe. This distortion allows portions of the leg to contact the edges of the flat surface causing one or possibly two extra detent positions.

A secondary problem with clips of this category, is that the openings weaken the clip, thereby reducing the effectiveness of the clip in maintaining the rotational position of the visor. This in turn reduces the life expectancy of the clip due to earlier fatigue failure.

An example of this type of clip appears in U.S. Pat. No. 4,617,699 to Nakamura which discloses a hinge structure for a visor or the like which features a single storage position snap action function. The U-shaped clip provides recesses to receive lobes on the pivot shaft when in the detent position. As discussed above, such an approach results in the second detent position.

U.S. Pat. Nos. 4,925,232 and 5,071,186 to Hemmeke et al., disclose a visor having a mounting bracket utilizing openings in the legs of the clip cooperating with lobes on the pivot shaft. In this configuration, a double detent position is not eliminated as discussed above.

U.S Pat. No. 4,394,043 to Moulding et al., discloses a visor and a mounting bracket having a longitudinally extending shaft. A mounting clip is connected to the visor which includes a leaf spring which exerts a radial force on the shaft to resist radial and axial movement. This design utilizes a clip with a single protrusion which corresponds to a single annular groove on the pivot shaft. In this configuration, the annular groove and protrusion are intended to prevent axial movement of the clip relative the pivot shaft. They do not prevent the leg from contacting the flat on the pivot shaft. This clip eliminated a second detent position by utilizing only one leg. However, by not being U-shaped (i.e. having 2-legs), this design is subject to early fatigue-cracking due to its inherent uneven distribution of stresses.

U.S. Pat. No. 4,841,599 to Cebollero discloses a spring mechanism for the hinge of a motor-vehicle visor having two different embodiments. In one embodiment, the pivot shaft does not have a flat surface and correspondingly no detent positions exist. Another embodiment teaches two flat surfaces on the pivot shaft with two corresponding detent positions.

U.S. Pat. No. 4,821,374 to Gavagan discloses a hinge assembly for a vehicle visor and other vehicle accessories. A clip is disclosed which relies on a leaf spring to exert pressure against one side of the pivot shaft. In this configuration, a plurality of flat surfaces are provided on the pivot shaft to obtain a corresponding number of detent positions.

U.S. Pat. No. 4,582,356 to Kaiser et al., discloses a pivot bearing for use with a visor for automotive vehicles. In this configuration, the clip is designed to slide axially along the pivot shaft. No attempt is made to eliminate the second detent position.

U.S. Pat. No. 4,057,287 to Lilja discloses a sun shade for a motor vehicle having a clip utilizing three longitudinally arranged sleeves in axial alignment. The center sleeve is slightly misaligned to provide friction against the pivot shaft. One embodiment utilizes a flat surface to provide a single detent position. This design does not provide the high detent-retention force of a U-shaped clip.

The present invention is directed to improving known mounting systems for use with visors for vehicles.

SUMMARY OF THE INVENTION

A mounting system in combination with a visor is provided. The visor is movable between a detented retracted position and an extended position. A pivot shaft is provided having a generally circular cross section. The pivot shaft cooperates with the visor. The pivot shaft has a flat surface along one side of the shaft which provides a detent position on the shaft for the visor when in the retracted position. An annular groove is provided which is oriented in a plane generally perpendicular to a longitudinal axis of the shaft. A clip is provided which cooperates with the shaft and the visor. The clip has a first leg and a second leg, such that either the first leg or the second leg has a protrusion which cooperates with the annular groove preventing either the first leg or the second leg from locating the flat surface while allowing the other leg to locate the flat surface to obtain the detent position when the visor is in the retracted position. A fastening means is provided for fastening the clip about the pivot shaft and to the visor.

Accordingly, an object of the present invention is to provide a mounting system for use with a vehicle visor which has a single detent position when the visor is in the retracted or stowed position while avoiding a second unwanted detent position.

Another object of the present invention is to provide a mounting system for use with a vehicle sun visor which is inexpensive to manufacture and which avoids early fatigue failure.

A feature of the present invention is to utilize a U-shaped clip having legs of generally equal length and width without cutouts or openings such that stress placed on the clip is equally distributed across the length of the clip.

An advantage of the present invention is that the clip eliminates the unwanted second detent position while enhancing strength and durability of the clip.

Another specific object of the invention is to provide a mounting system in combination with a visor which is movable between a detented retracted position and an extended position. A pivot shaft is provided having a generally circular cross section. The pivot shaft cooperates with the visor. The pivot shaft has a flat surface along one side of the shaft which provides a detent position on the shaft for the visor when in the retracted position. An annular groove is provided which is oriented in a plane generally perpendicular to a longitudinal axis of the shaft. A first clip is provided which cooperates with the shaft and the visor. The first clip has a first leg and a second leg, such that either the first leg or the second leg has a protrusion which cooperates with the annular groove preventing either the first leg or the second leg from locating the flat surface while allowing the other leg to locate the flat surface to obtain the detent position when the visor is in the retracted position. A second clip is provided which cooperates with the first clip to securely fasten the first clip about the pivot shaft. The second clip also functions to augment the clamping force applied to the pivot shaft by the first clip. A fastening means is provided for fastening the first clip to the second clip about the pivot shaft.

The above objects, features, and advantages of the present invention are readily apparent from the following detailed description of the invention when taken in connection with the accompanying drawings.

BRIEF DESCRIPTION OF THE DRAWINGS

FIG. 5 is a cross-sectional view taken along line 5—5 of FIG. 3;

FIG. 6 is an exploded perspective view similar to that of FIG. 1 showing an alternative embodiment of the present invention.

FIG. 7 is a rear side perspective view of the pivot shaft showing the first clip shown in FIG. 6;

FIG. 8 is a side perspective view in partial cut away showing an alternative embodiment of the present invention;

FIG. 9 is a rear side perspective view of the clip shown in FIG. 8;

FIG. 10 is a side perspective view of an alternative embodiment of the mounting system;

FIG. 11 is an exploded perspective view of the mounting system shown in FIG. 10 showing the major elements of the invention;

FIG. 12 is an exploded side view of the pivot shaft and first clip shown in FIG. 11;

FIG. 13 is a side view of the clips shown in FIG. 10, showing the cooperation of the first clip and second clip as fastened about the pivot shaft;

FIG. 14 is a sectional view of the invention taken along line 14—14 of FIG. 13;

FIG. 16A is a plan view of the first clip and pivot shaft viewed from the open end of the first clip to expose the first leg and second leg of the first clip on the pivot shaft, the first clip being shown at 90° from a visor detent position provided by a flat on the shaft;

FIG. 16B is a view similar to that shown in FIG. 7A showing the first clip at 180° from the detent (visor extended) position with protrusions on the first leg holding the first leg away from the flat on the shaft; and FIG. 16C is a view similar to that shown in FIG. 10A showing the first clip in the detent (visor retracted) position with the second leg of the clip positioned on the flat on the shaft.

DETAILED DESCRIPTION OF THE INVENTION

Figure 1:
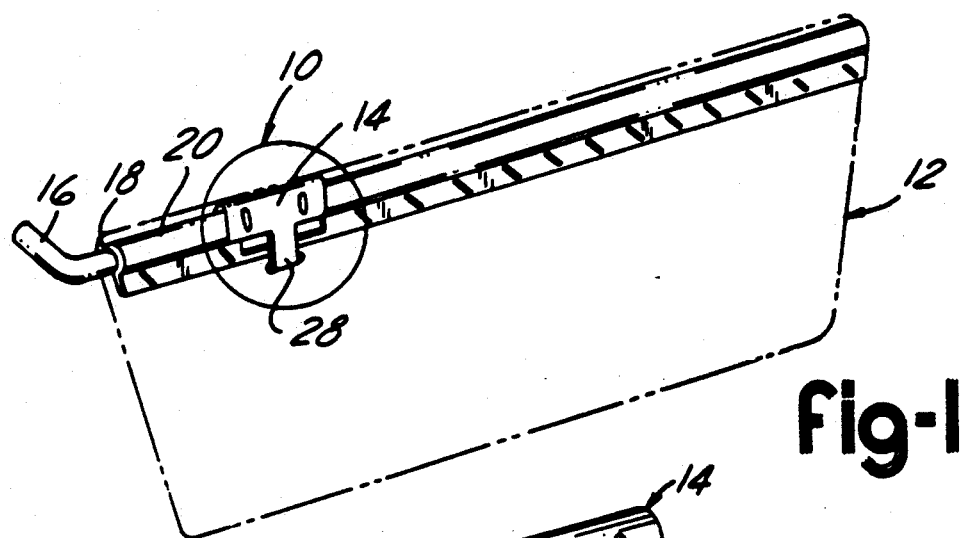
FIG. 1 is a perspective view of a visor showing the mounting system on a visor in accordance with the present invention.

The preferred embodiment shown in FIGS. 1 through 5 and 16A through 16C illustrates a mounting bracket 10 for use with a vehicle visor 12. The mounting bracket 10 shown in FIG. 1 is formed from a first clip 14 which is secured about a pivot shaft 16. The pivot shaft 16, passes through apertures 18 in a housing 20. This complete unit forms the mounting system for securing the visor 12 to a vehicle.

Figure 2:
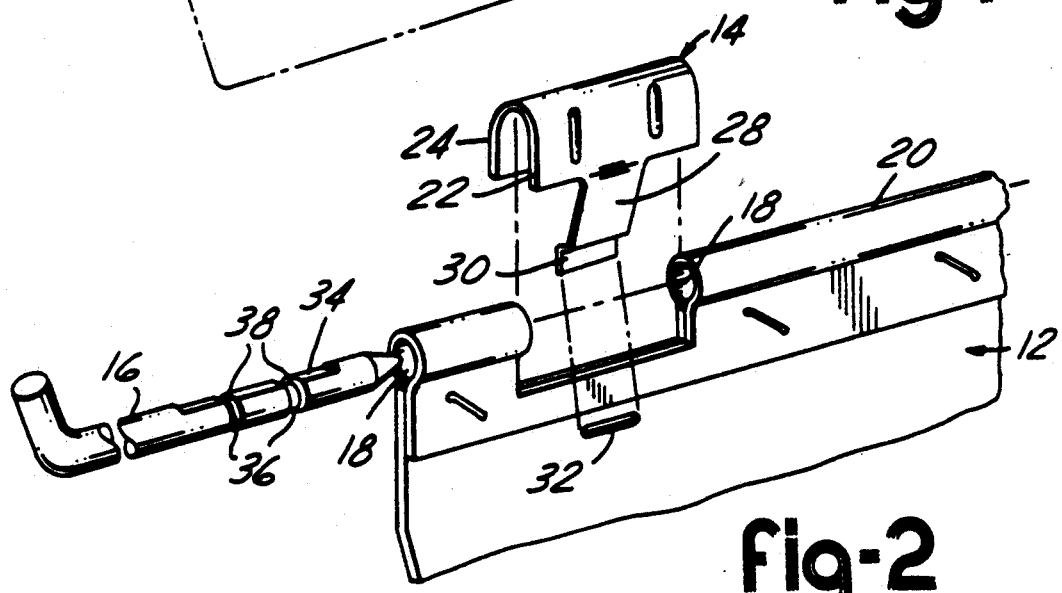
FIG. 2 is an exploded perspective view of the mounting system showing the major elements of the invention.
Figure 3:
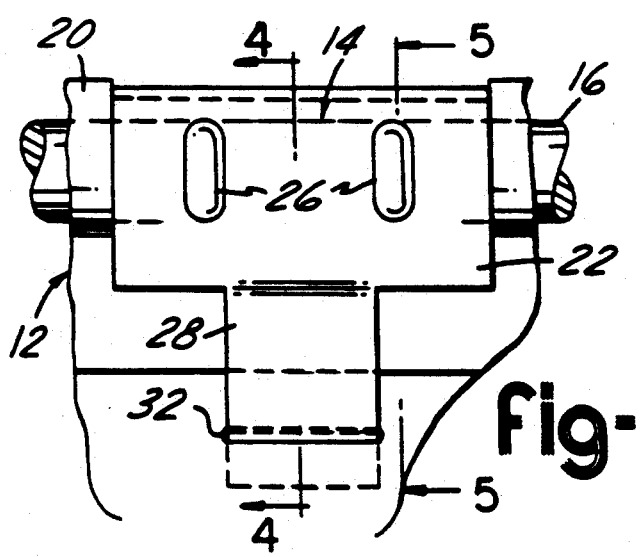
FIG. 3 is a fragmentary side view showing the mounting system in accordance with the present invention.
Figure 4:
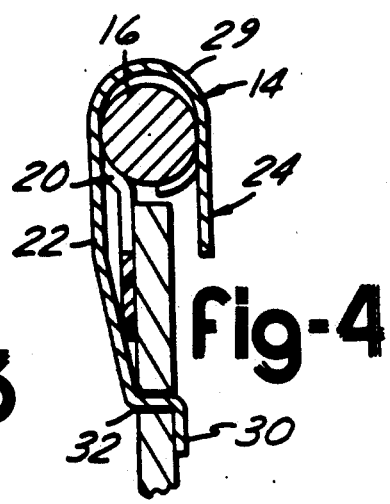
FIG. 4 is a cross-sectional view taken along line 4—4 of FIG. 3.
Figure 15:
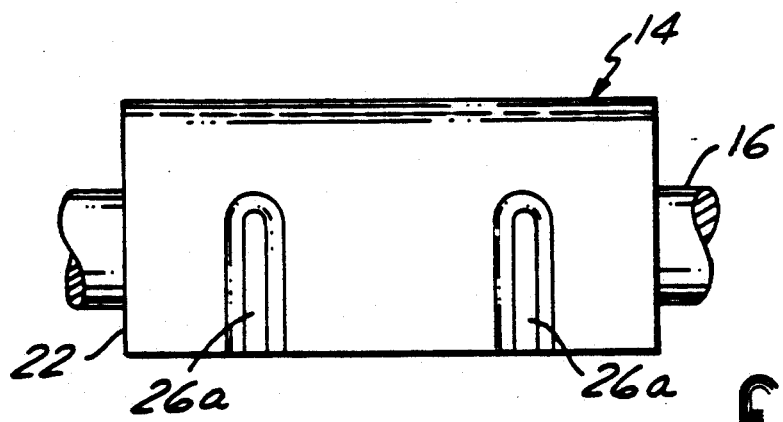
FIG. 15 is a side view of a clip similar to the first clip shown in FIGS. 1 and 10 showing an alternative embodiment of the first clip.

As shown best in FIGS. 2, 4 and 5, the first clip 14 has a U-shaped configuration having a first leg 22 and a second leg 24. In this embodiment, the first leg 22 and the second leg 24 are of generally equal dimensions and are formed of a resilient material allowing the first leg 22 and the second leg 24 to be placed under tension. The first leg 22 has two bridges or protrusions 26. An alternative embodiment of these protrusions 26 is shown in FIG. 15 which depicts the protrusions 26 as dimples 26a, which operate in the same fashion as the bridges 26.

The first leg 22 has a foot 28 which projects downward below the first leg 22 and toward the second leg 24 at an angle of approximately 45°. Located at the bottom of the foot 28 is a tab 30 which cooperates with slot 32 located in the visor 12 below the housing 20.

The pivot shaft 16, as shown in FIGS. 2, 6, 7, 12 and 16A-C, has a generally circular cross section. A flat surface 34 provides a detent position for the visor 12. The flat surface 34 is slightly larger in a longitudinal direction than the second leg 24 of the first clip 14, such that the second leg 24 easily fits onto the flat surface 34 as the first clip 14 travels about the pivot shaft 16.

Annular grooves 36 are oriented in planes generally perpendicular to the longitudinal axis of the pivot shaft 16. The annular grooves 36 have cammed sides 38 which cooperate with the protrusions 26 to assist in maintaining the protrusions 26 within the annular grooves 36. The protrusions 26 of the first leg 22 of the first clip 14, travel about the pivot shaft 16 in these annular grooves 36 such that the first leg 22 does not contact the flat surface 34.

Figure 16A:
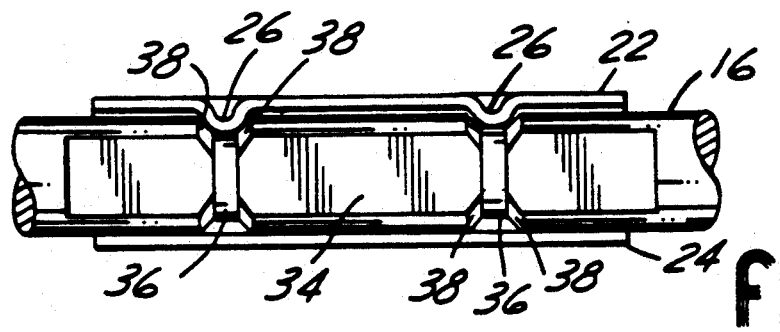
FIGS. 16A, 16B and 16C show the operation of the first clip.
Figure 16B:
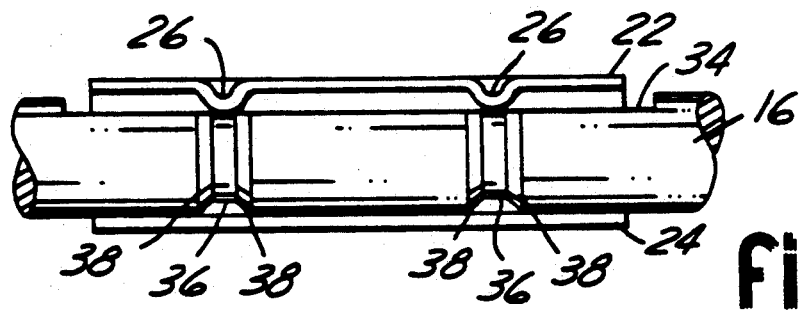
Figure 16C:
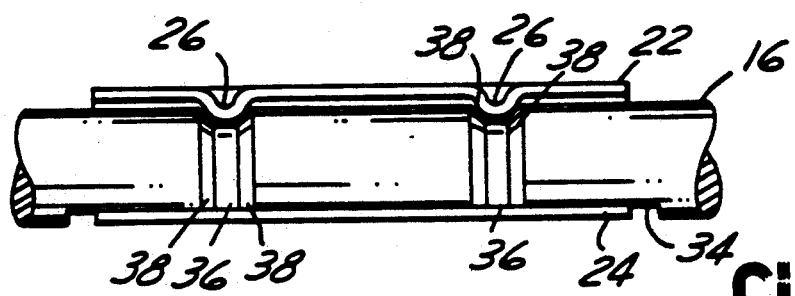

As shown in FIGS. 16A-C, the first clip 14 travels about the pivot shaft 16 as the visor 12 is moved between the retracted position and the extended position. FIG. 16C shows the visor 12 in the retracted position. In this position, the first leg 22 of the first clip 14 is positioned at approximately 180° from the flat surface 34 and the second leg 24 of the first clip 14 is located on the flat surface 34, in the detent position. In this position, the visor 12 is said to be in the retracted position with the visor 12 stowed adjacent the roof of the vehicle. FIG. 16B illustrates the visor when in the extended position. In this position, the first leg 22 of the first clip 14 is located above the flat surface 34. The protrusions 26 of the first leg 22 are such that the protrusions 26 of the first leg 22 bear against the annular grooves 36. The remainder of the first leg 22 does not contact the pivot shaft 16, avoiding engagement with the flat surface 34, thereby preventing an undesirable second detent position. FIG. 16A shows the first leg 22 of the first clip 14 at approximately 90° from the flat surface 34 or detent position. In this position, the first leg 22 travels about the pivot shaft 16 slightly thereabove, and the second leg 24 travels along the pivot shaft 16 in contact therewith.

In operation, the second leg 24 of the first clip 14 only engages the flat surface 34 when in the desired detent position. The first leg 22 does not contact the flat surface 34 in any position. The protrusions 26 run along the annular grooves 36. As a result of the protrusions 26 on the first leg 22 and the location of annular grooves 36 on the pivot shaft 16, only one detent position exists in the mounting system, thereby avoiding an unwanted second detent position.

Equivalent structure in describing the alternative embodiments will be identified with equivalent numerical designations with an associated prime number corresponding to the embodiment being described. The alternative embodiments described below contain the same characters, features, functions and advantages of the preferred embodiment unless otherwise stated.

A first alternative embodiment of the present invention is shown in FIGS. 6 and 7. In this embodiment, the first clip 14' has a generally U-shaped configuration wherein the second leg 24' is substantially longer than the first leg 22'. A pair of feet 28' project below the second leg 24'. Each foot 28' cooperates with a respective slot 32' in the housing 20'. Each foot 28' has a centrally located dimple 44 which also cooperates with each respective slot 32' to secure the first clip 14' within the housing 20' to prevent rotational movement of the first clip 14'. An end tab 46 is located at both ends of the first clip 14' to prevent the first clip 14' from vertical movement across the pivot shaft 16'. The protrusions 26', in this embodiment, are located on the second leg 24' rather than on the first leg 22' but perform the same function as in the preferred embodiment previously described.

A second alternative embodiment of the present invention is shown in FIGS. 8 and 9. In this embodiment, the first clip 14" is a generally U-shaped configuration such that the U-shaped configuration is inverted from that of the former embodiments. In addition, free ends of the first leg 22" a and the ( second leg 24" a curve toward each other to conform to the contours of the visor 12. In this configuration, the first leg 22" has a pair of feet 28" projecting below the closed end of the first clip 14". Each foot 28" has a corresponding L-shaped tab 30" which cooperates with a respective slot 32" located within the visor 12" to secure the first clip 14" within the visor 12" to prevent vertical movement and rotation of the first clip 14".

A third alternative embodiment of the present invention shown in FIGS. 10 through 14, has the mounting bracket 10''' formed from the first clip 14''' and a second clip 48. The second clip 48 is generally U-shaped having a first leg 50 and a second leg 52. The first leg 50 and the second leg 52 have similar dimensions and are formed of a resilient material allowing the first leg 50 and the second leg 52 to be placed under tension. The first leg 50 and the second leg 52 of the second clip 48 each define an aperture 54. The aperture 54 is adapted to cooperate with the catch 56 on the first clip 14''' when the second clip 48 is press-fit over the first clip 14'''.

As shown in FIG. 11, the housing 20''' has an upper rib 58 and a lower rib 60. The upper rib 58 is generally U-shaped in cross-section and is adapted to cooperate with the first clip 14'''. The lower rib 60 is parallel to the upper rib 58 and spans the same distance of the housing 20''''. An upper surface 62 of the lower rib 60 is generally concave in shape and is adapted to provide a seat for the pivot shaft 16'''. The upper rib 58 cooperates with the first clip 14''' so as to limit the first clip's 14'''downward travel toward the pivot shaft 16'''The lower rib 60 cooperates with the second clip 48 to limit the second clip's 48 upward travel toward the pivot shaft 16'''.

The purpose of the second clip 48 and its configuration is to ensure that the first clip 14''' is secured in position about the pivot shaft 16''' and to provide additional clamping force to the pivot shaft 16'''. This is accomplished by having the first leg 50 and the second leg 52 of the second clip 48 forced apart under tension to be press-fit over the first clip 14'''. As the aperture 54 is seated on the catch 56, the first leg 50 and the second leg 52 of the second clip 48 cause the first leg 22''' and the second leg 24''' of the first clip 14''' to flex and be maintained under constant tension which is imparted to the pivot shaft 16''' ensuring that the first clip 14''' is securely affixed thereto.

To mount the visor 12''' in this alternative embodiment, the first clip 14''' is placed over the upper rib 58. The second clip 48 is placed over the lower rib 60 and press-fitted over the first clip 14'''. Then the pivot shaft 16''' is slid into the visor 12''' through the aperture 18'''' in the housing 20'''' and press-fitted into position between the first leg 22''' and second leg 2 ''' of the first clip 14''' to complete the mounting system.

The second clip 48 is secured to the first clip 14''' such that the second clip 48 does not engage the pivot shaft 16''', as best shown in FIG. 14. Instead, the second clip 48 ensures that the first clip 14''' is securely seated about the pivot shaft 16'''. In addition, the second clip 48 augments the force applied to the pivot shaft 16''' by the first clip 14'''.

While the best mode for carrying out the invention has been described in detail, those familiar with the art to which this invention relates will recognize various alternative designs and embodiments for practicing the invention as defined by the following claims.

What is claimed is:

1. A mounting system in combination with a visor movable between a detented retracted position and an extended position, said system comprising:
    a pivot shaft having a generally circular cross section, said shaft cooperating with said visor, and said shaft having a flat surface along one side of said shaft, said flat surface providing a detent position on said shaft for locating said visor when in said retracted position;
    an annular groove formed on said shaft oriented in a plane generally perpendicular to a longitudinal axis of said shaft;
    a clip cooperating with said shaft and said visor, said clip having a first leg and a second leg, one only of said first leg and said second leg having a protrusion cooperating with said annular groove preventing said one only of said first leg and said second leg from locating on said flat surface when said visor is in said extended position while allowing the other of said first leg and said second leg to locate on said flat surface to obtain said detent position when said visor is in said retracted position; and
    fastening means for fastening said clip about said pivot shaft and to said visor.

2. The system according to claim 1 wherein said shaft further includes a plurality of annular grooves and wherein said one only of said first leg and said second leg includes a plurality of protrusions, said protrusions protrude generally perpendicular to one of said first leg and said second leg elevating said one of said first leg and said second leg above said flat surface on said pivot shaft.

3. The system according to claim 2 wherein said plurality of protrusions are configured to travel within said plurality of annular grooves as said visor is moved about said pivot shaft.

4. The system according to claim 2 wherein said plurality of annular grooves include a cammed side which cooperates with said plurality of protrusions to assist in maintaining said plurality of protrusions within said plurality of annular grooves.

5. The system according to claim 1 wherein said detent position is located on said pivot shaft generally in a position 180° from said extended position.

6. The system according to claim 1 wherein said first leg and said second leg have a resilient construction.

7. The system according to claim 1 wherein said fastening means includes said clip having a foot having a tab projecting below one of said first leg and said second leg.

8. The system according to claim 1 wherein said fastening means further includes said visor defining a slot cooperating with said tab to secure said clip to said visor.

9. The system according to claim 8 wherein said visor includes a housing defining an aperture to receive said shaft.

10. The system according to claim 1 wherein said clip includes a generally U-shaped configuration adapted to receive said shaft.

11. A mounting system in combination with a visor movable between a detented retracted position and an extended position, said system comprising:
    a pivot shaft having a generally circular cross section, said shaft cooperating with said visor, and said shaft having a flat surface along one side of said shaft, said flat surface providing a detent position on said shaft for locating said visor when in said retracted position;
    an annular groove formed on said shaft oriented in a plane generally perpendicular to a longitudinal axis of said shaft;
    a first clip cooperating with said shaft and said visor, said first clip having a first leg and a second leg, one only of said first leg and said second leg having a protrusion cooperating with said annular groove preventing said one only of said first leg and said second leg from locating on said flat surface when said visor is in said extended position while allowing the other of said first leg and said second leg to locate on said flat surface to obtain said detent position when said visor is in said retracted position;
    a second clip cooperating with said first clip to securely fasten said first clip about said pivot shaft; and
    fastening means for fastening said first clip to said second clip about said pivot shaft.

12. The system according to claim 11 wherein said fastening means includes a catch located on one of said first clip and said second clip and the other of said first clip and said second clip defining an aperture adapted to cooperate with said catch.

13. The system according to claim 12 wherein said catch comprises a flange located on one of said first leg and said second leg, said flange having a fixed end adjacent one of said first leg and said second leg and a free end distal said one of said first leg and said second leg.

14. The system according to claim 11 including a plurality of annular grooves and wherein said one only of said first leg and said second leg includes a plurality of protrusions, said protrusions protrude generally perpendicular to one of said first leg and said second leg elevating said one of said first leg and said second leg above said flat surface on said pivot shaft.

15. The system according to claim 14 wherein said plurality of protrusions are configured to travel within said plurality of annular grooves as said visor is moved about said pivot shaft.

16. The system according to claim 15 wherein said plurality of annular grooves include a cammed side which cooperates with said plurality of protrusions to assist in maintaining said plurality of protrusions within said plurality of annular grooves.

17. The system according to claim 11 wherein said detent position is located on said pivot shaft generally in a position 180° from said extended position.

18. The system according to claim 11 wherein said second clip has a generally U-shaped configuration adapted to cooperate with said first clip.

19. The system according to claim 11 wherein said first leg and said second leg have a resilient construction.

* * * * *